May 3, 1932.  C. E. LATSHAW  1,856,769
CULINARY IMPLEMENT
Filed Nov. 3, 1930
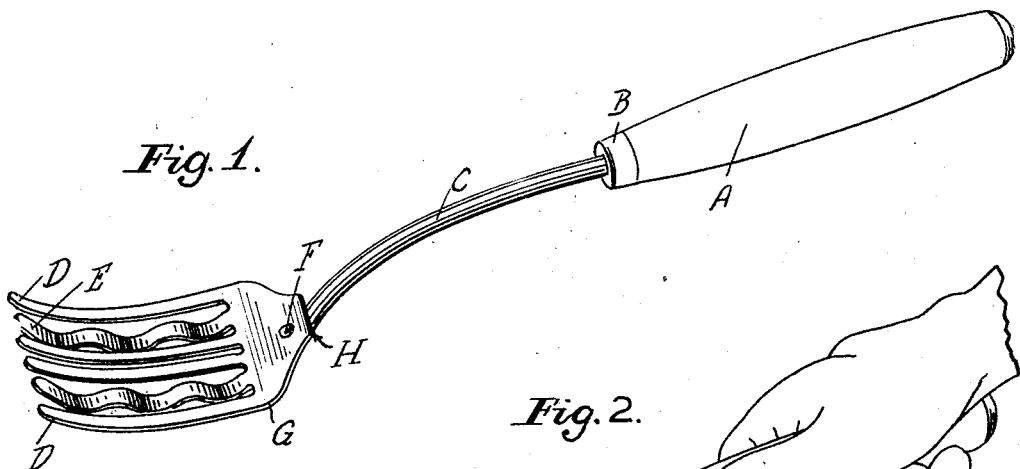
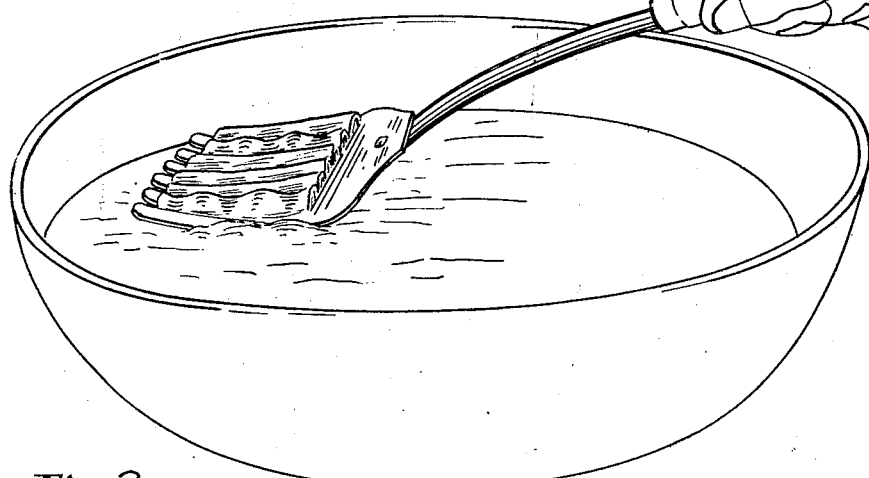
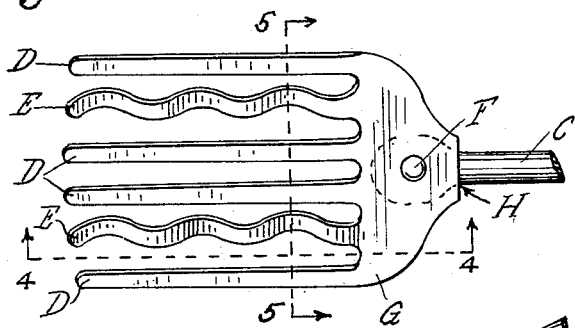
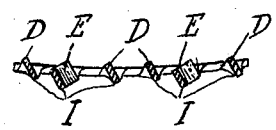
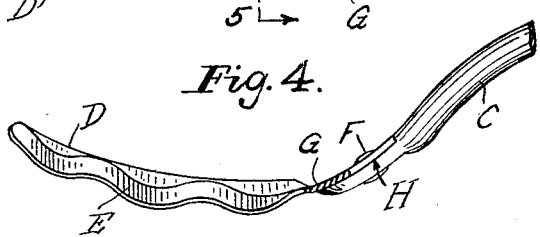
INVENTOR
BY Charles E. Latshaw
ATTORNEY Patented May 3, 1932

1,856,769

UNITED STATES PATENT OFFICE

CHARLES EDWARD LATSHAW, OF MINNEAPOLIS, MINNESOTA

CULINARY IMPLEMENT

Application filed November 3, 1930. Serial No. 493,156.

The object of the invention is to provide a hand utensil, of simple and durable construction in one implement, for the several purposes. Another object is to provide an implement of sanitary construction, that is easily and quickly cleaned, it being free from lodging or hiding places for food to remain and become putrid, there being no apertures nor serrations in its construction. A still further and more particular object is to provide an implement that is so simple, capable and thoroughly practical in its mixing of pie crust, biscuit and cake dough that it is absolutely unnecessary to touch the mixture with the hands. It is a well known fact that in mixing lard, flour and baking powder with the hands that the heat thereof explodes the carbonic acid gas contained in the leavening agent. This utensil, by its use obviates the necessity of placing the hands in the mixture, and by its use a lighter, richer and more palatable bread or pastry is produced, and pronounced sanitary results are secured. Moreover in cold weather where chilled lard or other shortening agent is used it is not only exceedingly difficult to effect its thorough blending with the flour and other ingredients, but also painful to the hands of the operator to mix large quantities of the shortening agent together, but by the employment of this implement, due to its knife-like construction this objectionable feature is positively eliminated, as the rectangle cutting edges of the blades will, with but slight pressure be caused to cut through the lard and at the same time carry it through and blend or intermingle it with the flour and other substances, in a labor-saving and expeditious manner. Another object is to provide in this construction a stirring implement, that will supplement various other culinary implements in domestic use such as spoons in stirring gravy when same is desired to be of a seal brown color and free from lumps. The spoon with its concave bowl presses or spreads the flour thickening to the pan, while this implement with its rectangle cutting edges scrapes and removes the thickening from the heated inner lower surface of the pan, and the obliquely upward turned blades raise the portion that has been browned by the heat and cause the lighter colored upper portion to flow downward to the heated inner surface of the pan, and thus a smooth evenly colored brown gravy is secured. A still further object is to provide in this construction an implement for cutting and mashing boiled potatoes and other kindred vegetables, and whipping same. A further object is to provide in this construction an implement for stirring and beating candy, the long curved shank and slab-shape wood handle makes it possible for that purpose without danger of the operator burning the hands, and in a like manner it is desirable for serving boiled dinner from the kettle, the liquid drains between the blades and the solids are served on the plate with a minimum of the liquid. To these ends my invention consists generally in a utility utensil of certain novel features of construction and combination of parts, such as a utensil for domestic use, in mixing, stirring, beating, cutting and serving.

It will be more readily understood by reference to the accompanying drawings forming part of this specification in which, Fig. 1, is a plan view of the utensil in perspective. Fig. 2, is a perspective view illustrating the utensil in use, which movement is from right to left. Fig. 3, is a plan view of the head portion showing the blades. Fig. 4, is a view in side elevation taken on line 4—4 of Fig. 3, showing the corrugated blades E and the symmetrical upward horizontal curvature of blades D. Fig. 5, is an end view of Fig. 1 taken on line 5—5 of Fig. 3 disclosing the rectangle edges of blades D and E.

The head or blade portion of this utensil is made from heavy sheet metal, preferably from very heavy stainless steel. The blades are produced by incising the stock with heavy stamping dies and the sections thus separated form the blades. The shank is made from stainless steel wire, and is welded and riveted to the butt of the head. The handle is a slab shaped from wood turning. Like letters of reference designate corresponding parts in all the figures of the drawings. A is a wood handle, B is a metal ferrule, and C is a curved wire shank. D represents the blades which are twisted or turned downward from right to left with respect to plane of use on an angle of about forty-five degrees, said turns extending from the butt G outward to the end of the blade thus forming a rectangle cutting edge on their lower corner, said blades having also a symmetrical upward curvature extending horizontally from the butt G to their apex thereby causing the under edge of the blades to be convex and the upper edge thereof to be concave. Blades E are similarly formed to blades D but in addition they are corrugated. F is a rivet. H points to the butt of head, showing where the shank is welded to the head. I points to the rectangle edges of all the blades. The object of the slab shaped wood handle is to prevent turning in the hand of the operator while in use. The shank is made long so as to enable the operator to stir and serve hot vegetables and the like without danger of burning the hands. The welding closes any gap or crevice that may be left open where food may lodge and become putrid. I desire it to be understood that various changes in the form, proportion, size, and minor details of construction within the scope of the appended claim may be resorted to without departing from the spirit or, sacrificing any of the advantages of this invention.

What I claim is:

In a utensil of the class described, a flat base having a hand attached thereto, flat tines inclined with respect to the flat base, said tines being in substantial parallel relation and substantially in line, certain tines being straight and certain tines formed with wave portions therein, said waved tines being positioned intermediate of the straight tines, the top edges of the waved tines being positioned in a plane below the plane of the top edges of the straight tines, and the bottom edges of the waved tines being positioned in a plane below the plane of the bottom edges of the straight tines.

CHARLES EDWARD LATSHAW.